United States Patent
Qin et al.

(10) Patent No.: US 11,770,305 B2
(45) Date of Patent: Sep. 26, 2023

(54) DISTRIBUTED MACHINE LEARNING IN EDGE COMPUTING

(71) Applicant: International Business Machines Corporation, Armonk, NY (US)

(72) Inventors: Dong Qin, Shaan Xi (CN); Jing Du, Beijing (CN); Li Jia Lu, Xian (CN); Lin Zhang, Beijing (CN); Miao Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 17/444,674

(22) Filed: Aug. 9, 2021

(65) Prior Publication Data

US 2023/0037308 A1    Feb. 9, 2023

(51) Int. Cl.
| | | |
|---|---|---|
| G06F 15/16 | (2006.01) | |
| H04L 41/147 | (2022.01) | |
| H04L 41/14 | (2022.01) | |
| H04L 43/0811 | (2022.01) | |
| H04L 41/16 | (2022.01) | |
| H04L 43/0852 | (2022.01) | |

(52) U.S. Cl.
CPC .......... H04L 41/147 (2013.01); H04L 41/145 (2013.01); H04L 41/16 (2013.01); H04L 43/0811 (2013.01); H04L 43/0852 (2013.01)

(58) Field of Classification Search
CPC ...................................................... H04L 41/16
USPC ........................................................ 709/224
See application file for complete search history.

(56) References Cited

U.S. PATENT DOCUMENTS

| | | | |
|---|---|---|---|
| 10,643,150 B2 | 5/2020 | Hack | |
| 2013/0286833 A1* | 10/2013 | Torres | H04L 43/10 370/235 |
| 2019/0342419 A1* | 11/2019 | Bromand | H04N 21/41422 |
| 2019/0369984 A1 | 12/2019 | Malladi | |
| 2020/0012966 A1 | 1/2020 | Nagaraju | |
| 2020/0050951 A1 | 2/2020 | Wang | |
| 2020/0074380 A1* | 3/2020 | Mori | G06Q 10/0633 |

(Continued)

FOREIGN PATENT DOCUMENTS

| | | |
|---|---|---|
| CN | 102447576 B | 5/2015 |
| CN | 111030861 A | 4/2020 |

(Continued)

OTHER PUBLICATIONS

Huihui et al., "A Network Optimal Path Algorithm Balanced Bandwidth and Cost", 2018, Comuter & Digital Engineering, vol. 46 No. 11, 6 pages.

(Continued)

*Primary Examiner* — Dustin Nguyen
*Assistant Examiner* — Joel Mesa
(74) *Attorney, Agent, or Firm* — Stephen R. Yoder

(57) ABSTRACT

Approaches presented herein enable deploying a distributed machine learning framework in an edge computing environment. More specifically, a status of a connection between a computing system and an edge node of a plurality of edge nodes is monitored. At least one server node and a group of worker nodes from the plurality of edge nodes are identified based on the status. A path for distributing the training data to the worker nodes is determined based on the status. The training data from the edge node to the worker nodes is distributed via the path.

20 Claims, 6 Drawing Sheets

(56) References Cited

U.S. PATENT DOCUMENTS

2020/0366585 A1* 11/2020 Nainar ................ H04L 43/0811
2021/0014133 A1    1/2021 Maciocco
2021/0158216 A1*  5/2021 Du ........................ G06N 20/00

FOREIGN PATENT DOCUMENTS

| CN | 111432005 A | 7/2020 |
| CN | 112612601 A | 4/2021 |
| CN | 113011602 A | 6/2021 |

OTHER PUBLICATIONS

Li et al., "Parameter Server for Distributed Machine Learning", printed on May 19, 2021, 10 pages.

Mell et al., "The NIST Definition of Cloud Computing", National Institute of Standards and Technology U.S. Department of Commerce, Special Publication 800-145, Sep. 2011, 7 pages.

Wang et al., "Adaptive Federated Learning in Resource Constrained Edge Computing Systems", arXiv:1804.05271v2 [cs.DC] Feb. 17, 2019, 20 pages.

"Patent Cooperation Treaty PCT Notification of Transmittal of the International Search Report and the Written Opinion of the International Searching Authority, or the Declaration", Applicant's file reference PF220523PCT, International application No. PCT/CN2022/109911, International filing date Aug. 3, 2022, dated Oct. 27, 2022, 10 pages.

* cited by examiner

DISTRIBUTED MACHINE LEARNING IN EDGE COMPUTING

TECHNICAL FIELD

The present disclosure relates to edge computing, and more specifically, to distributed machine learning in an edge computing environment.

BACKGROUND

Edge computing is a distributed computing framework that brings enterprise applications closer to data sources such as Internet of Things (IoT) devices or local edge servers. These devices or servers with certain network bandwidth, storage and computing resources may be referred as edge nodes. Traditionally, edge nodes are in communication with each other and may receive pre-trained models from a cloud for local predication. However, in most cases the connection between the edge nodes and the cloud is not stable enough, thus the edge nodes may not receive the latest models all the time.

SUMMARY

Approaches presented herein enable deploying a distributed machine learning framework in edge computing. More specifically, a status of a connection between a computing system and an edge node of a plurality of edge nodes is monitored. At least one server node and a group of worker nodes from the plurality of edge nodes are identified based on the status. A path for distributing the training data to the worker nodes is determined based on the status. The training data from the edge node to the worker nodes is distributed via the path.

According to one embodiment of the present disclosure, there is provided a computer-implemented method. According to the method, one or more processors monitor a status of a connection between a computing system and an edge node of a plurality of edge nodes, the plurality of edge nodes configured to receive a prediction model from the computing system via the connection. In response to determining that the status is a predetermined status, one or more processors identify at least one server node and a group of worker nodes from the plurality of edge nodes based on the status, the worker nodes each configured to train the predication model based on training data distributed from the edge node and the at least one server node configured to combine training results received from the worker nodes. One or more processors determine a path for distributing the training data to the worker nodes based on the status. One or more processors distribute the training data from the edge node to the worker nodes via the path.

According to another embodiment of the present disclosure, there is provided a system. The system comprises a processing unit and a memory coupled to the processing unit. The memory stores instructions that, when executed by the processing unit, perform actions comprising: monitoring a status of a connection between a computing system and an edge node of a plurality of edge nodes, the plurality of edge nodes configured to receive a prediction model from the computing system via the connection; in response to determining that the status is a predetermined status, identifying at least one server node and a group of worker nodes from the plurality of edge nodes based on the status, the worker nodes each configured to train the predication model based on training data distributed from the edge node and the at least one server node configured to combine training results received from the worker nodes; determining, by one or more processors, a path for distributing the training data to the worker nodes based on the status; and distributing, by one or more processors, the training data from the edge node to the worker nodes via the path.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: monitoring a status of a connection between a computing system and an edge node of a plurality of edge nodes, the plurality of edge nodes configured to receive a prediction model from the computing system via the connection; in response to determining that the status is a predetermined status, identifying at least one server node and a group of worker nodes from the plurality of edge nodes based on the status, the worker nodes each configured to train the predication model based on training data distributed from the edge node and the at least one server node configured to combine training results received from the worker nodes; determining, by one or more processors, a path for distributing the training data to the worker nodes based on the status; and distributing, by one or more processors, the training data from the edge node to the worker nodes via the path.

Still yet, any of the components of the present invention could be deployed, managed, serviced, etc., by a service provider who offers to perform distributed machine learning in edge computing.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
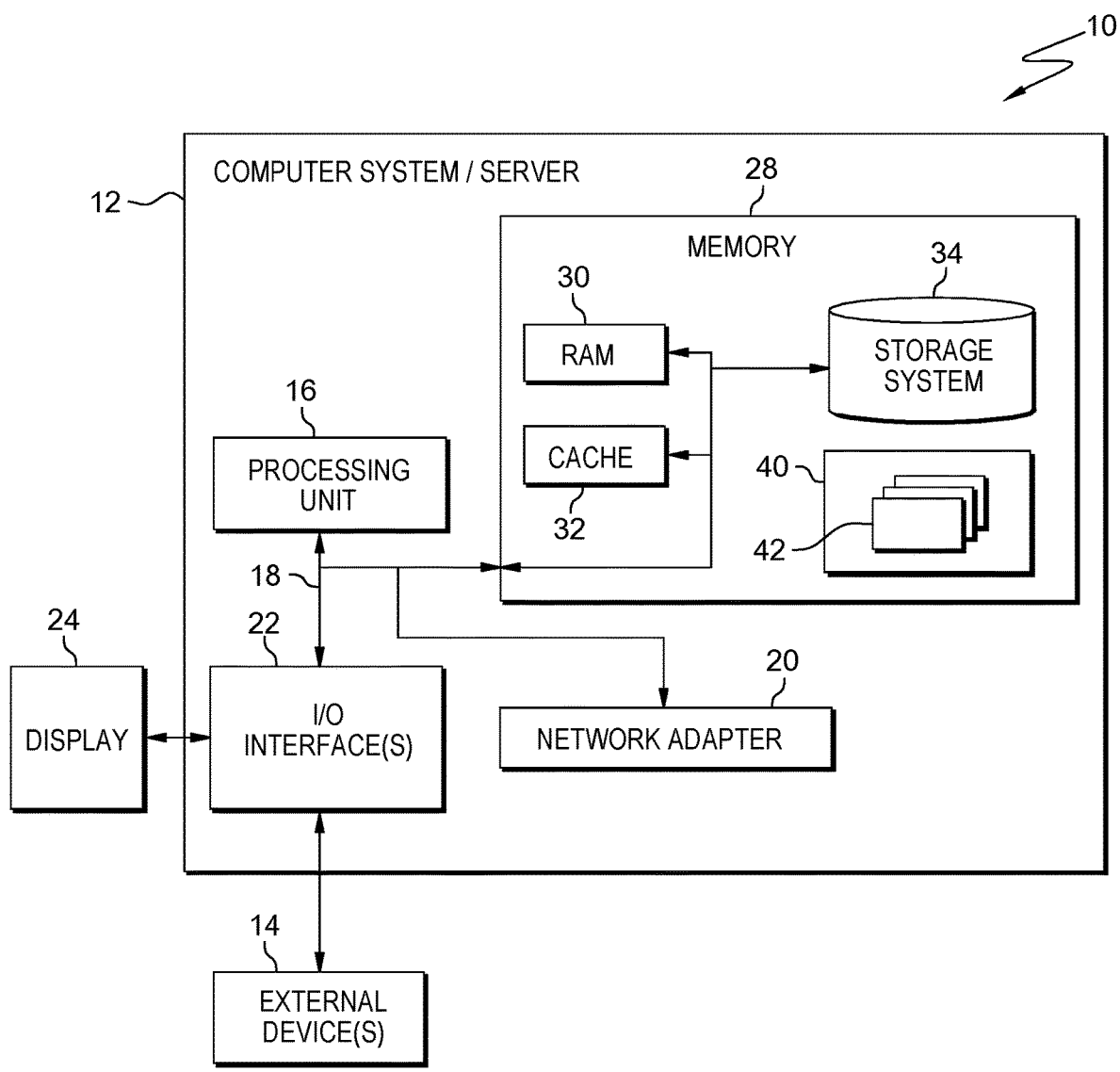
FIG. 1 depicts a cloud computing node according to an embodiment of the present disclosure.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
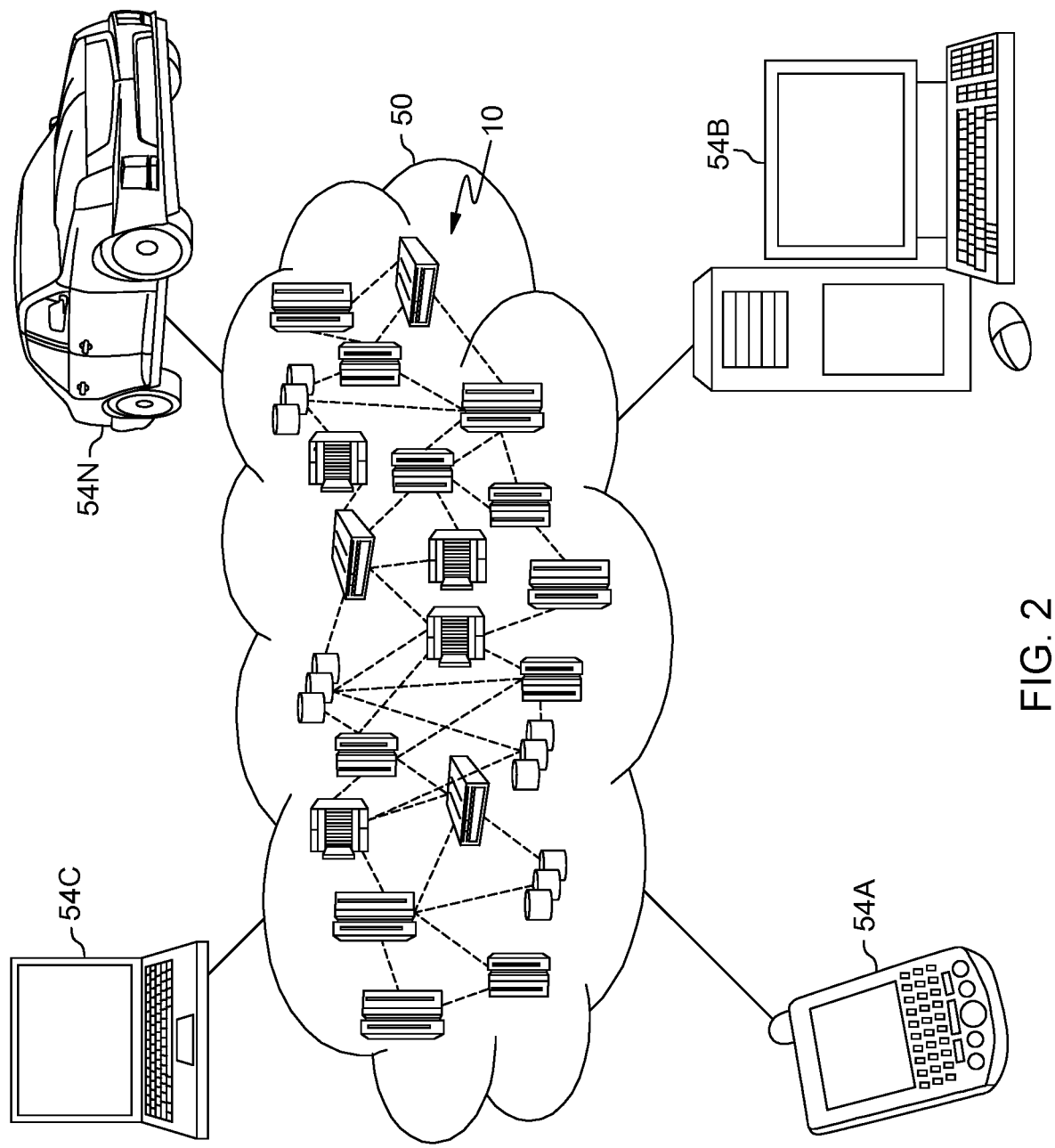
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
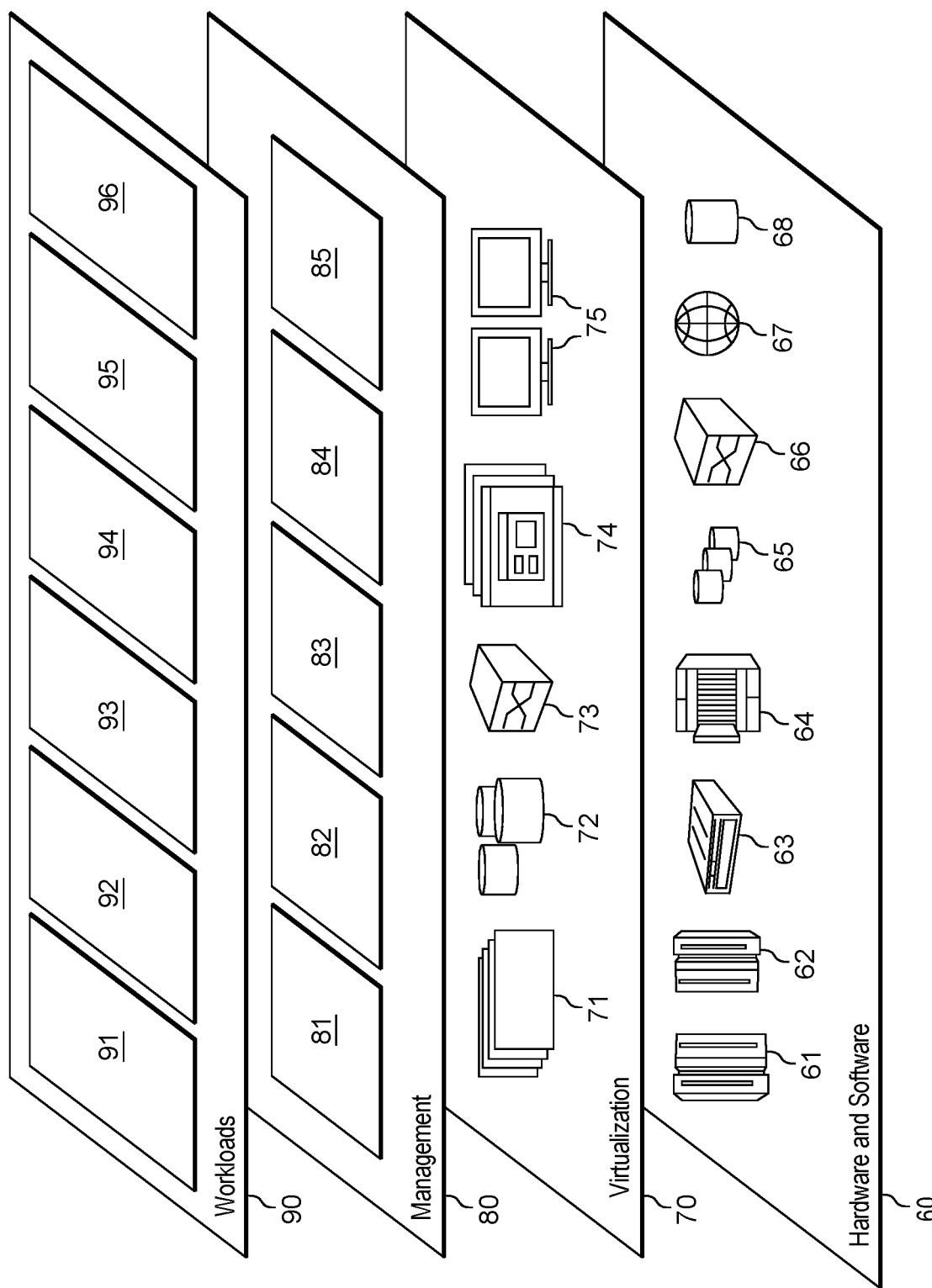
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed machine learning 96. Hereinafter, reference will be made to FIG. 4-6 to describe details of the distributed machine learning 96.

As described above, edge computing exploits the computing resources of the edge nodes to perform tasks and provide services. For example, edge nodes may receive a pre-trained model from the cloud and use the pre-trained model to make predictions based on local data. However, the connection between the edge nodes and the cloud may not be stable enough to allow the edge nodes to receive the latest models all the time. In this case, the edge nodes may use outdated models to make predications, leading to a significant drop of the prediction performance. Thus, a solution of temporarily training models on the edge nodes in the case of abnormal connection is highly in demand.

Traditionally, a single edge node does not have enough resource to train the model, thus a distributed machine learning framework may be deployed to integrate all of the resources of different edge nodes. However, the deployment of distributed machine learning in an edge computing environment may be optimized. For example, the distributed machine learning may be deployed based on a status of a connection between the cloud and edge nodes. Moreover, the training efficiency and performance may be improved by performing optimized node selection and data routing operations. Thus, a deployment solution for better exploiting the resources of edge nodes to train the model is still needed.

In order to at least partially solve the above and other potential problems, embodiments of the present disclosure provide a solution for deployment of machine learning framework in edge computing environments. According to the solution, a status of a connection between a computing system and an edge node of a plurality of edge nodes is monitored. The plurality of edge nodes is configured to receive a prediction model from the computing system via the connection. In response to determining that the status is a predetermined status, at least one server node and a group of worker nodes from the plurality of edge nodes are identified based on the status. The worker nodes each is configured to train the predication model based on training data distributed from the edge node. The at least one server node is configured to combine training results received from the worker nodes. A path for distributing the training data to the worker nodes is determined based on the status. The training data is distributed from the edge node to the worker nodes via the path.

As such, this solution allows a temporary edge-side model training when the connection is abnormal. Thus, the robustness and performance of machine learning applications utilizing the prediction model may be improved. Moreover, by identifying the at least one server node and a group of worker nodes as well as determining the path for distributing training data based on the status, the training efficiency may also be improved.

Figure 4:
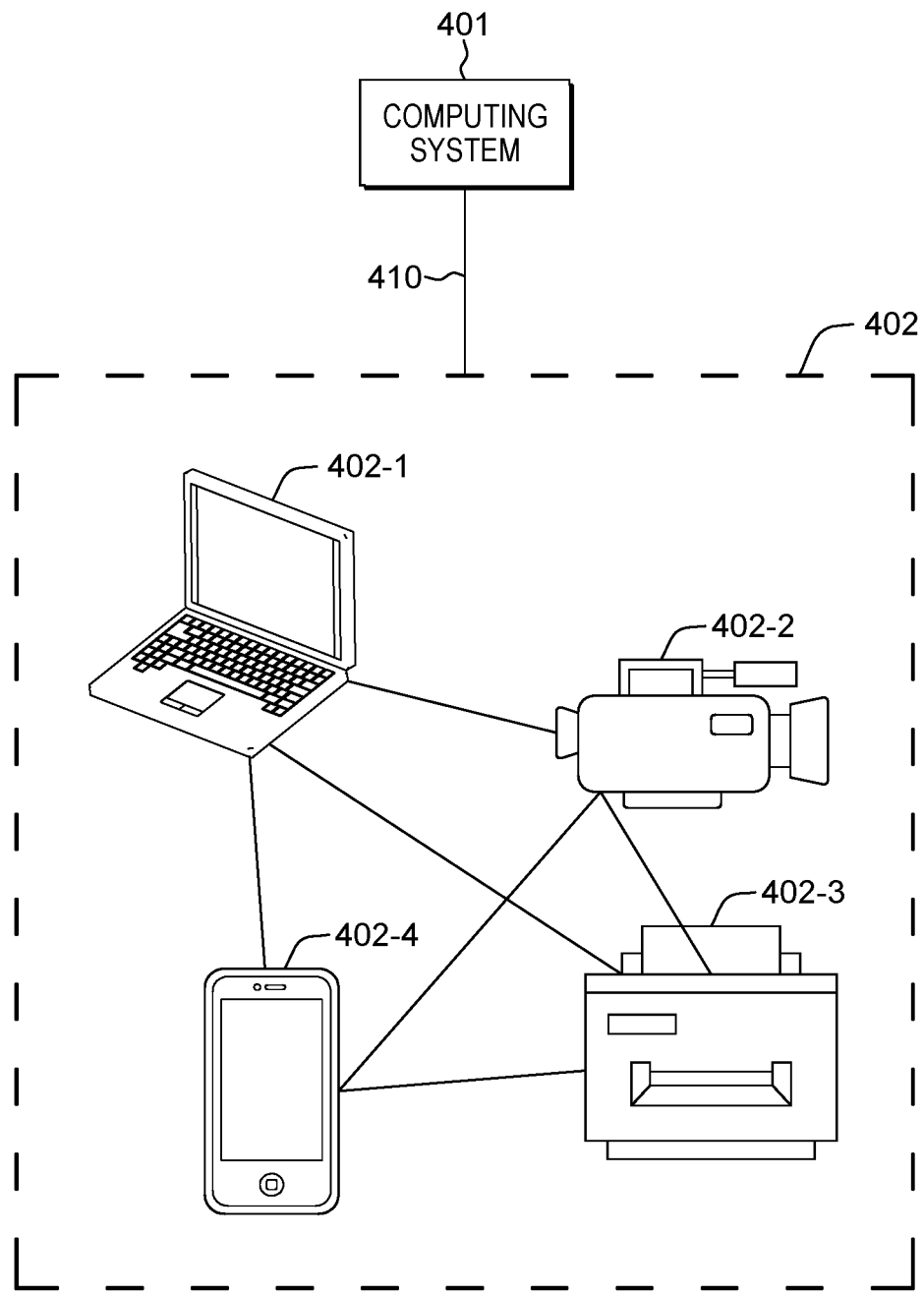
FIG. 4 depicts a computing environment for deploying distributed machine learning framework according to embodiments of the present disclosure.

With reference now to FIG. 4, a computing environment 400 in which embodiments of the present disclosure can be implemented is shown. It is to be understood that the elements of the environment 400 are described only for the purpose of illustration without suggesting any limitations as to the scope of the present disclosure. The embodiments of the present disclosure can be embodied with different elements. For example, at least part or all of the environment 400 may be implemented by computer system/server 12 of FIG. 1.

As shown in FIG. 4, the environment 400 may include a computing system 401 and a plurality of edge nodes 402. The computing system 401 may be a cloud computing system (also referred as the cloud hereafter) or any system implemented by computer system/server 12 of FIG. 1. The plurality of edge nodes 402 may be a cluster or a network of edge nodes in communication. The edge nodes may refer to intelligent devices or machines with certain network bandwidth, storage and computing resources. The edge nodes may also be implemented by computer system/server 12 of FIG. 1. The examples of edge nodes may include, but not limit to a personal computer 402-1, a camera 402-2, a printer 402-3 and a mobile phone 402-4.

The computing system 401 may be connected 410 to the plurality of edge nodes 402 via any communication link, such as one or more networks such as a local area network (LAN), a general wide area network (WAN), and/or a public network (e.g., the Internet). The plurality of edge nodes 402 may receive a prediction model from the computing system 401 via the connection and perform prediction tasks using the prediction model based on local data at the edge nodes.

The prediction model may be any machine learning/Artificial Intelligence (AI) model, such as gesture recognition model, speech recognition model, and the like. The prediction model may be pre-trained at the computing system 401 based on training data received from the plurality of edge nodes 402. Then, the plurality of edge nodes 402 may directly use the prediction model to perform prediction. For example, a user may use his mobile phone 402-4 to perform gesture recognition task by utilizing a gesture recognition model previously trained at the cloud. In this case, the mobile phone 402-4 may be referred as a prediction node for accessing training data and performing predictions. It is to be noted that more than one prediction nodes may exist at the same time in the plurality of edge nodes 402 depending on user's choice. For example, the user may perform the gesture recognition task on his mobile phone 402-4 and perform a speech recognition task on his printer 402-3. In this case, the mobile phone 402-4 and printer 402-3 are respective prediction nodes corresponding to different prediction tasks.

As mentioned above, the connection between the computing system 401 and the plurality of edge nodes 402 may be abnormal and thus the plurality of edge nodes 402 may need to train the model on their own to maintain the robustness and prediction performance of the AI application using the model. Therefore, a distributed machine learning framework may be deployed to temporarily train the model at edge nodes. The details of the deployment may be described with reference to FIG. 5-6.

Figure 5:
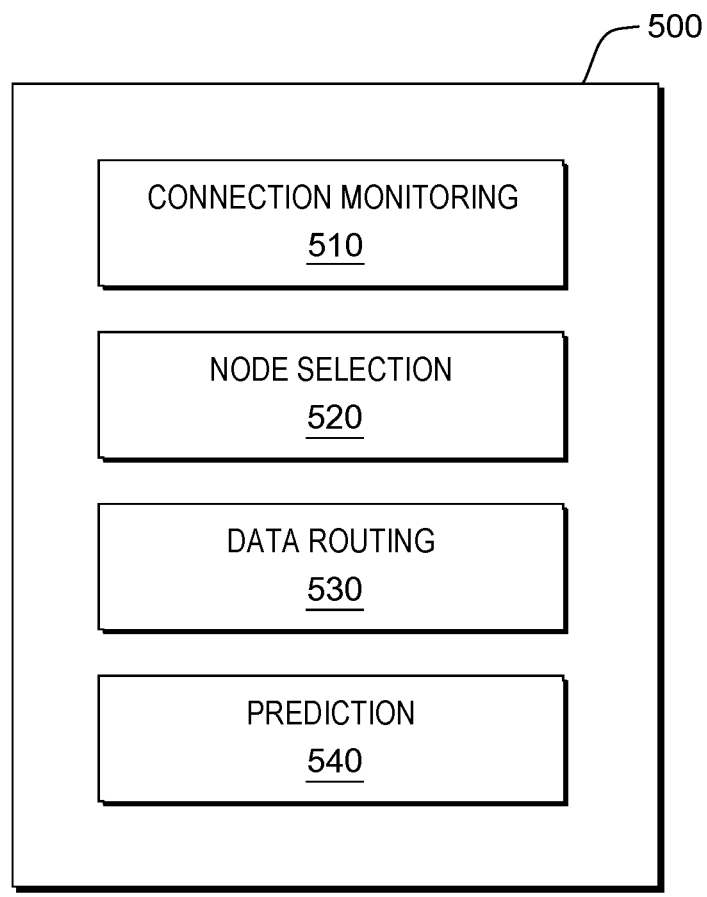
FIG. 5 depicts a prediction node for deploying distributed machine learning framework according to embodiments of the present disclosure.

With reference now to FIG. 5, a prediction node 500 in which embodiments of the present disclosure can be implemented is shown. It is to be understood that the structure and functionality of the prediction node 500 are described only for the purpose of illustration without suggesting any limitations as to the scope of the present disclosure. The embodiments of the present disclosure can be embodied with a different structure and/or functionality. For example, at least part or all of the prediction node 500 may be implemented by computer system/server 12 of FIG. 1. The prediction node 500 may be implemented by any edge node of the plurality of edge nodes 402. For example, the prediction node 500 may be implemented by the mobile phone 402-4 for accessing training data and performing speech recognition predictions. The prediction node 500 may facilitate the deployment of the distributed machine learning framework when the connection is abnormal. As such, the prediction node 500 may perform predictions using the prediction model trained at the edge nodes and thus improve the robustness of the AI application.

As shown in FIG. 5, the prediction node 500 may include a connection monitoring module 510, a node selection module 520, a data routing module 530 and a prediction module 540. The connection monitoring module 510 may monitor a status of a connection 410 between the computing system 401 and the prediction node 500. The plurality of edge nodes 402 may be configured to receive a prediction model from the computing system 401 via the connection 410. For example, the connection monitoring module 510 may monitor the connection 410 between the cloud 401 and the prediction node 500. Moreover, when the connection 410 is normal, the prediction node 500 and the other edge nodes of the plurality of edge nodes 402 may constantly receive a latest trained prediction model from the cloud 401 for performing predictions.

In some embodiments, the connection monitoring module 510 may monitor a time period required by the prediction node 500 for receiving the prediction model from the computing system 401. The required time period may refer to a period of time for the prediction node 500 successfully receiving the latest trained prediction model from the computing system 401. In response to the time period exceeding a first threshold, the connection monitoring module 510 may determine that the status is a first abnormal status. The first threshold may be determined based on the normal time period required for receiving the prediction model from the computing system 401. The first abnormal status may refer to the connection 410 being in a weak connection mode. For example, the connection monitoring module 510 may monitor a time period required by the prediction node 500 for receiving the prediction model from the cloud 401. Moreover, the connection monitoring module 510 may determine that the connection 410 is in the weak connection mode when it takes longer to receive a pre-trained model from the cloud 401.

In some embodiments, the connection monitoring module 510 may monitor duration of disconnection between the prediction node 500 and the computing system 401. In response to the duration exceeding a second threshold, the connection monitoring module 510 may determine that the status is a second abnormal status. The second threshold may be determined based on the normal connection condition between the prediction node 500 and computing system 401. The second abnormal status may refer to the connection 410 being in an offline mode. For example, the connection monitoring module 510 may determine that the connection 410 is in the offline mode when the connection 410 between the prediction node 500 and the cloud 401 is off for a longer period than expected.

As mentioned above, when the status is abnormal, such as the connection 410 being in the weak connection mode or offline mode, the training may be switched from the cloud 401 to the plurality of edge nodes 402 to maintain robustness and performance of the AI application. In this case, a distributed machine learning framework may be deployed to use the computing resources of edge nodes for training. It is to be understood that the distributed machine learning framework may be deployed when the status is any predetermined status specified by the user. The predetermined status may include the status in weak connection mode or offline mode. Specifically, the node selection module 520 and the data routing module 530 may facilitate the deployment of distributed machine learning framework based on the status.

The node selection module 520 may identify at least one server node and worker nodes from the plurality of node 402 based on the status. In the distributed machine learning framework, the worker nodes each may be configured to train the predication model based on training data distributed from the prediction node 500. The prediction model may be the first version of model received from the computing system 401 when the plurality of edge nodes 402 connects the computing system 401 for the first time. Alternatively, the prediction model may be the latest model received before the connection 410 is off. Alternatively, the prediction model may be the latest model received when the connection 410 is in a weak connection mode. The training data may be distributed from the prediction node 500 which is allowed to access data for training. Each of the worker nodes may train the prediction model and determine gradients for updating parameters of the prediction model. The at least one server node may be configured to aggregate training results received from the worker nodes. The server nodes may update parameters of the prediction model based on the gradients determined from all worker nodes.

In some embodiments, data parallelism may be implemented to deploy a parameter server (PS) machine learning framework for edge nodes. In the PS machine learning framework, the worker nodes each may train the prediction model based on a split of the training data instead of all training data obtained at the prediction node 500. The at least one server node may be configured to aggregate the training results of the worker nodes and update the parameters of the prediction model previously received. It is to be noted that, if more than one server node exists, each of the server nodes may maintain a portion of the parameters and keep them updated.

As mentioned above, the predetermined status may refer to the status of connection 410 being in a weak connection mode or an offline mode. In some embodiments, if it is determined that the connection 410 is in the weak connection mode, the node selection module 520 may identify the at least one server node by determining transmission delays of the plurality of edge nodes 402. The node selection module 520 may identify the at least one server node and the group of worker nodes from the plurality of edge nodes, the at least one edge node with shorter transmission delays than the group of worker nodes. The node selection module 520 may identify at least one edge node with shorter transmission delay in the plurality of edge nodes 402 as the at least one server node. The transmission delay may indicate communication efficiency between one edge node with the other edge nodes. The node selection module 520 may identify at least one edge node with higher communication efficiency in the plurality of edge nodes 402 as the at least one server node.

In some embodiments, in order to determine the transmission delays of the plurality of edge nodes 402, the node selection module 520 may cause a first edge node of the plurality of edge nodes 402 to send requests to other edge nodes of the plurality of edge nodes 402. The first edge node may refer to any edge node of the plurality of edge nodes 402. For example, the first node may be the mobile phone 402-4.

The node selection module 520 may determine time intervals between the first edge node sending the requests to the other edge nodes and receiving corresponding responses from the other edge nodes. The requests and responses may be of any kind for obtaining communication conditions between the edge nodes. For example, ping requests and corresponding pong requests may be used to determine the communication delay of the first edge node with the other edge nodes. The time intervals may indicate the communication delay between the first edge node and the other edge nodes. For example, time intervals may be determined as a period of time between the first edge node sending the requests to the other edge nodes and receiving corresponding responses from the other edge nodes.

The node selection module 520 may determine the transmission delay of the first edge node based on the determined time intervals. The node selection module 520 may determine the transmission delay of the first edge node by accumulating the time intervals between the first edge node and the other edge nodes. Alternatively, the node selection module 520 may accumulate the time intervals based on different weights associated with different edge nodes. In this way, the node selection module 520 may determine the transmission delays of all of the edge nodes of the plurality of edge nodes 402.

For example, when determining the transmission delay of edge node i of the plurality of edge nodes 402 (with a total number of N), edge node i may send ping requests to all of the other edge nodes (edge node j, j≠i). In responsive to receiving a ping request, edge node j may return a corresponding pong response to edge node i. The time interval between edge node i sending the ping request and edge node i receiving a response from edge node j may be determined as the time delay $t_j$ between edge node i and edge node j. By accumulating the time delay between edge node i and the other edge nodes ($\Sigma_{j,j \neq i}^{N} t_j$), the transmission delay $T_i$ of edge node i may be determined. In this case, the node selection module 520 may rank the transmission delays of the plurality of edge nodes 402 and select a number of k (k≥1) edge nodes with k minimum transmission delays as the at least one server node. The remaining nodes of the plurality of edge nodes 402 may be identified as the worker nodes. It is to be noted that, in this case the prediction node in the plurality of nodes may also be identified as a server node or worker node. Alternatively, the node selection module 520 may exclude the prediction node from consideration when ranking and identifying the at least one server node. In this case, the prediction node may not be identified as a server node or worker node.

In this way, when the connection 410 is determined as in the weak connection mode, the identified at least one server node may receive the training results from different worker nodes in a shorter period due to the shorter transmission delay. Thus, the prediction model can be updated and pushed to the prediction node 500 shortly when the connection is weak. As such, the prediction node 500 may maintain the execution of the AI application before the connection recovers. In this way, the robustness of the AI application and the user experience in the weak connection mode may be improved.

In some embodiments, when the connection 410 is determined as in the offline mode, the node selection module 520 may identify the at least one server node by determining transmission delays and computing resources of the plurality of edge nodes 402. As mentioned above, the transmission delay may indicate communication efficiency between one edge node with the other edge nodes. The details of determining the transmission delays may be omitted herein. The computing resources of each edge node may indicate its capability of training models, processing data and so on. For example, the computing resources may be related to the processor, storage, memory of the edge nodes. The node selection module 520 may identify the at least one server node based on the transmission delays and computing resources of the plurality of edge nodes 402. The node selection module 520 may identify the at least one server node based on a combined metric considering both the transmission delays and computing resources of edge nodes.

In some embodiments, in order to determine the computing resources of the plurality of edge nodes 402, the node selection module 520 may cause a first edge node of the plurality of edge nodes 402 to train a sample model based on sample training data. The first edge node may refer to any edge node of the plurality of edge nodes 402. For example, the first node may be the mobile phone 402-4. The sample model and sample training data may be received previously from the computing system 401. The sample model may be any machine learning model for evaluating the computing resources of edge nodes and the sample training data may be any appropriate dataset. For example, the sample model may be a handwritten digit recognition model and the corresponding sample training data may be the Modified National Institute of Standards and Technology (MNIST) dataset. Additionally, or alternatively, the sample model and sample training data may be prediction task specific.

The node selection module 520 may determine a training time required for training the sample model to achieve a predetermined performance and determine the training time as a metric of computing resource of the first edge node. The predetermined performance may be determined based on normal prediction performance. For example, the predetermined performance may be a classification accuracy of 90%. The node selection module 520 may record the training time needed to achieve the classification accuracy of 90% and use the training time to indicate the amount of the computing resource of the first edge node. The shorter the training time that is required, the greater amount of the computing resource is determined. Alternatively, the node selection module 520 may determine the prediction performance of the sample model trained for a specific period of time as the metric of the computing resource of the first edge node. For example, the node selection module 520 may determine the prediction accuracy of the trained sample model as the metric. In this case, the higher the prediction accuracy is, the greater amount of the computing resource of the first edge node is determined.

In some embodiments, in order to identify the at least one server node based on the transmission delays and computing resources, the node selection module 520 may determine a combined metric based on the transmission delay and the training time of each of the plurality of edge nodes. The node selection module 520 may identify the at least one server node and the group of worker nodes from the plurality of edge nodes and the at least one server node has smaller combined metrics than the group of worker nodes. For example, the node selection module 520 may combine the transmission delay and the required training time of each edge node as a combined metric for identifying the at least one server node. Additionally, the combined metric may be determined based on different weights. For example, the node selection module 520 may simply add the transmission delay and the required training time and use a sum as the combined metric. The node selection module 520 may rank the combined metric and identify k (k≥1) edge nodes with k smallest combined metric as the at least one server node.

In this way, the at least one server node is identified based on both the transmission delays and computing resources of the edge nodes. As mentioned above, by selecting edge nodes with shorter transmission delays, the prediction model can be updated and pushed to the prediction node 500 shortly. In the meantime, by taking the computing resources into account, edge nodes with better computing capability may be identified as the at least one server node. As such, in the offline mode, in addition to maintaining the execution of the AI application using the rapidly updated model, the prediction node 500 may also use the prediction model with great prediction performance. In this way, the robustness of the AI application and the user experience in the offline mode may be improved.

As mentioned above, the worker nodes may be configured to locally train the initial/current version of prediction model based on training data distributed from the prediction node 500. The data routing module 530 may determine a path for distributing the training data to the worker nodes based on the status and distribute the training data from the prediction node 500 to the worker nodes via the path. The data routing module 530 may use any suitable shortest path algorithm to determine the path for distributing training data based on the status. In some embodiments, when PS machine learning framework is deployed, the data routing module 530 may split the training data obtained at the prediction node 500 based on the number of worker nodes and then distribute the split training data to each worker node for local training.

In some embodiments, if it is determined that the connection 410 between the prediction node 500 and the computing system 401 is in the weak connection mode, the data routing module 530 may determine the path based on the transmission delays of the edge nodes. For example, the data routing module 530 may use the Dijkstra Algorithm to find an optimal path based on the transmission delays obtained from node selection module 520. The Dijkstra Algorithm is known, and further description is not believed necessary.

In some embodiments, if it is determined that the connection 410 between the prediction node 500 and the computing system 401 is in the offline mode, the data routing module 530 may determine the path based on at least one of the transmission delays, computing resources and available bandwidth of the edge nodes. The transmission delays and computing resources may be obtained from the node selection module 520. The available bandwidth may be obtained by the built-in test tool of the edge node. The data routing module 530 may use any suitable shortest path algorithm considering the transmission delays, computing resources and the available bandwidth of the edge nodes and the like. For example, the data routing module 530 may use the Network Optimal Path Algorithm to determine the optimal path for distributing training data.

In this way, the data routing module 530 may determine the path based on the status. As such, in the weak connection mode, rapid distribution of training data may allow the prediction model to be updated and pushed in time before the connection recovers. In addition, in the offline mode, the determined optimal path may allow the prediction model to be updated rapidly while a high level of prediction performance of the model to be maintained.

The prediction module 540 may obtain the prediction model from the at least one server node and perform a prediction operation by using the prediction model. The prediction module 540 may pull the prediction model from the at least one server node and perform predictions based on local data at the prediction node 500. For example, a user may perform gesture recognition task on his mobile phone 402-4 based on the gesture data obtained from a camera of the mobile phone 402-4.

Figure 6:
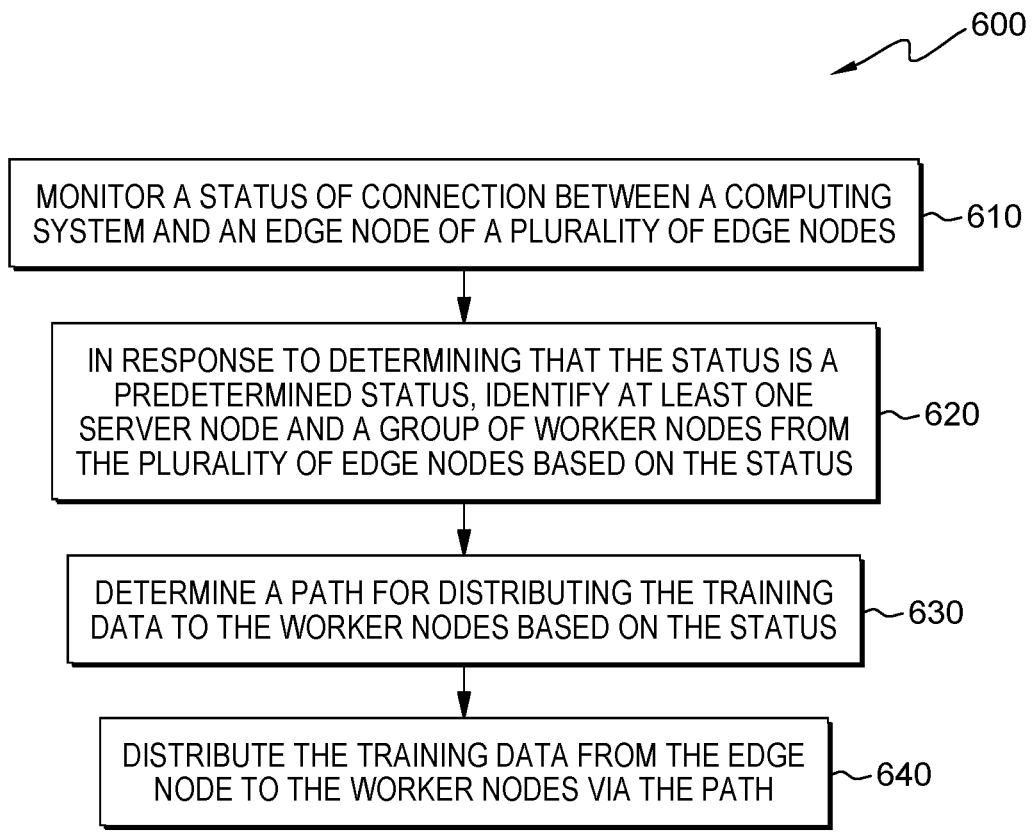
FIG. 6 depicts a flowchart of an example method for deploying distributed machine learning framework according to embodiments of the present disclosure.

FIG. 6 depicts a flowchart of an example method 600 for deployment of a distributed machine learning framework according to embodiments of the present disclosure. The method 600 may be implemented at the prediction node 500 as shown in FIG. 5. For example, at least part or all of the prediction node 500 may be implemented by computer system/server 12 of FIG. 1. It is to be understood that the method 600 may also comprise additional blocks (not shown) and/or may omit the illustrated blocks. The scope of the present disclosure described herein is not limited in this aspect.

At block 610, the prediction node 500, for example, by means of the connection monitoring module 510, monitors a status of a connection between a computing system 401 and an edge node of a plurality of edge nodes 402, the plurality of edge nodes 402 configured to receive a prediction model from the computing system 401 via the connection.

In some embodiments, in order to monitor the status, the prediction node 500, for example, by means of the connection monitoring module 510, may monitor a time period required by the edge node for receiving the prediction model from the computing system 401. In response to the time period exceeding a first threshold, the prediction node 500, for example, by means of the connection monitoring module 510, may determine that the status is the predetermined status.

In some embodiments, in order to monitor the status, the prediction node 500, for example, by means of the connection monitoring module 510, may monitor a duration of disconnection between the edge node and the computing system. In response to the duration exceeding a second threshold, the prediction node 500, for example, by means of the connection monitoring module 510, may determine that the status is the predetermined status.

At block 620, the prediction node 500, for example, by means of the node selection module 520, identifies, in response to determining that the status is a predetermined status, at least one server node and a group of worker nodes from the plurality of edge nodes 402 based on the status. The worker nodes each may be configured to train the predication model based on training data distributed from the edge node and the at least one server node may be configured to aggregate training results received from the worker nodes.

In some embodiments, in order to identify at least one server node and a group of worker nodes, the prediction node 500, for example, by means of the node selection module 520, may determine transmission delays of the plurality of edge nodes and identify the at least one server node and the group of worker nodes from the plurality of edge nodes, the at least one edge node with shorter transmission delays than the group of worker nodes.

In some embodiments, in order to determine transmission delays, the prediction node 500, for example, by means of the node selection module 520, may cause a first edge node of the plurality of edge nodes to send requests to other edge nodes of the plurality of edge nodes; determine time intervals between the first edge node sending the requests to the other edge nodes and receiving corresponding responses from the other edge nodes; and determine the transmission delay of the first edge node based on the determined time intervals.

In some embodiments, in order to identify at least one server node and a group of worker nodes, the prediction node 500, for example, by means of the node selection module 520, may determine transmission delays and computing resources of the plurality of edge nodes; and identify the at least one server node based on the transmission delays and computing resources.

In some embodiments, in order to determine computing resources, the prediction node 500, for example, by means of the node selection module 520, may cause a first edge node of the plurality of edge nodes to train a sample model based on sample training data, wherein the sample model and sample training data is received previously from the computing system; determine a training time required for training the sample model to achieve a predetermined performance; and determine the training time as a metric of the computing resource of the first edge node.

In some embodiments, in order to identify the at least one server node, the prediction node 500, for example, by means of the node selection module 520, may determine a combined metric based on the transmission delay and the training time of each of the plurality of edge nodes; and identify the at least one server node and the group of worker nodes from the plurality of edge nodes, the at least one server node with smaller combined metrics than the group of worker nodes.

At block 630, the prediction node 500, for example, by means of the data routing module 530, determines a path for distributing the training data to the worker nodes based on the status.

In some embodiments, in order to determine the path, the prediction node 500, for example, by means of the data routing module 530, may determine the path based on the transmission delays.

In some embodiments, in order to determine the path, the prediction node 500, for example, by means of the data routing module 530, may determine the path based on at least one of the transmission delays, the computing resources and available bandwidth of the plurality of edge nodes.

At block 640, the prediction node 500, for example, by means of the data routing module 530, distributes the training data from the edge node to the worker nodes via the path.

In some embodiments, the prediction node 500, for example, by means of the prediction module 540, may obtain the prediction model from the at least one server node and perform a prediction operation by using the prediction model.

In some embodiments, the computing system is a cloud computing system.

It can be seen that embodiments of the present disclosure provide a solution for deployment of a distributed machine learning framework based on the status of connection. This solution allows the temporary training at the edge nodes when the connection is abnormal and improves the robustness of AI application. Moreover, this solution provides an optimized node selection and data routing method to make the better use of the computing resources of the node.

It should be noted that the processing of deployment of a distributed machine learning framework according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributed machine learning in an edge computing environment, comprising:
    monitoring a status of a connection between a computing system and a plurality of edge nodes, the plurality of edge nodes configured to receive a prediction model from the computing system via the connection, the prediction model being trained by the computing system on training data received from the plurality of edge nodes;
    determining the status of the connection between the computing system and the plurality of edge nodes has changed from a normal status to an abnormal status, with the abnormal status being a weak connection mode or an offline mode;
    in response to determining the status is an abnormal status, identifying, according to a parameter server machine learning framework, at least one server node and a group of worker nodes from the plurality of edge nodes, the group of worker nodes configured to train a current prediction model using training data distributed from the plurality of edge nodes, the at least one server node configured to aggregate training results received from the group of worker nodes;
    determining a routing path for distributing the training data from the at least one server node to the group of worker nodes based on the abnormal status of the connection;
    distributing the training data from the at least one server node to the group of worker nodes via the routing path;
    training, by the group of worker nodes, a current prediction model received from the computing system using the training data received via the routing path to create a trained prediction model; and
    responsive to determining the status of the connection has returned to the normal status, causing the trained prediction model to be trained by the computing system on training data received from the plurality of edge nodes via the connection.

2. The method of claim 1, further comprising:
    obtaining the prediction model from the at least one server node; and
    performing a prediction operation by using the prediction model.

3. The method of claim 1, wherein identifying the at least one server node and the group of worker nodes comprises:
    determining transmission delays of the plurality of edge nodes; and
    wherein determining transmission delays of the plurality of edge nodes comprises:
    causing the first edge node of the plurality of edge nodes to send requests to other edge nodes of the plurality of edge nodes;
    determining time intervals between the first edge node sending the requests to the other edge nodes and receiving corresponding responses from the other edge nodes; and
    determining the transmission delay of the first edge node based on the determined time intervals.

4. The method of claim 3, wherein monitoring the status comprises:

monitoring a time period required by the first edge node for receiving the prediction model from the computing system; and in response to the time period exceeding a first threshold, determining that the status is the abnormal status.

5. The method of claim 4, wherein identifying the at least one server node and the group of worker nodes further comprises:

identifying the at least one server node and the group of worker nodes from the plurality of edge nodes, the at least one server node having shorter transmission delays than the group of worker nodes.

6. The method of claim 4, wherein determining the path comprises:

determining the path based on the transmission delays.

7. The method of claim 3, wherein monitoring the status comprises:

monitoring a duration of disconnection between the first edge node and the computing system; and in response to the duration exceeding a second threshold, determining that the status is the abnormal status.

8. The method of claim 7, wherein identifying the at least one server node and the group of worker nodes further comprises:

determining computing resources of the plurality of edge nodes; and identifying the at least one server node based on the transmission delays and computing resources.

9. The method of claim 8, wherein determining computing resources of the plurality of edge nodes comprises:

causing the first edge node of the plurality of edge nodes to train a sample model based on sample training data, wherein the sample model and sample training data is received previously from the computing system;

determining a training time required for training the sample model to achieve a predetermined performance; and determining the training time as a metric of the computing resource of the first edge node.

10. The method of claim 9, wherein identifying the at least one server node based on the transmission delays and computing resources comprises:

determining a combined metric based on the transmission delay and the training time of each of the plurality of edge nodes; and identifying the at least one server node and the group of worker nodes from the plurality of edge nodes, the at least one server node with smaller combined metrics than the group of worker nodes.

11. The method of claim 8, wherein determining the path comprises:

determining the path based on at least one of the transmission delays, the computing resources and available bandwidth of the plurality of edge nodes.

12. A system for distributed machine learning in an edge computing environment, comprising:

a processing unit; and a memory coupled to the processing unit and storing instructions thereon, the instructions, when executed by the processing unit, performing actions comprising:

monitoring a status of a connection between a computing system and a plurality of edge nodes, the plurality of edge nodes configured to receive a prediction model from the computing system via the connection, the prediction model being trained by the computing system on training data received from the plurality of edge nodes;

determining the status of the connection between the computing system and the plurality of edge nodes has changed from a normal status to an abnormal status, with the abnormal status being a weak connection mode or an offline mode;

in response to determining the status is an abnormal status, identifying according to a parameter server machine learning framework, at least one server node and a group of worker nodes from the plurality of edge nodes, the group of worker nodes configured to train a current prediction model using training data distributed from the plurality of edge nodes, the at least one server node configured to aggregate training results received from the group of worker nodes;

determining a routing path for distributing the training data from the at least one server node to the group of worker nodes based on the abnormal status of the connection;

distributing the training data from the at least one server node to the group of worker nodes via the routing path;

training, by the group of worker nodes, a current prediction model received from the computing system using the training data received via the routing path to create a trained prediction model; and responsive to determining the status of the connection has returned to the normal status, causing the trained prediction model to be trained by the computing system on training data received from the plurality of edge nodes via the connection.

13. The system of claim 12, wherein identifying the at least one server node and the group of worker nodes comprises:

determining transmission delays of the plurality of edge nodes; and wherein determining transmission delays of the plurality of edge nodes comprises:

causing a first edge node of the plurality of edge nodes to send requests to other edge nodes of the plurality of edge nodes;

determining time intervals between the first edge node sending the requests to the other edge nodes and receiving corresponding responses from the other edge nodes; and determining the transmission delay of the first edge node based on the determined time intervals.

14. The system of claim 13, wherein monitoring the status comprises:

monitoring a time period required by the edge node for receiving the prediction model from the computing system; and in response to the time period exceeding a first threshold, determining that the status is one of the set of predetermined statuses.

15. The system of claim 14, wherein identifying the at least one server node and the group of worker nodes further comprises:

identifying the at least one server node and the group of worker nodes from the plurality of edge nodes, the at least one edge node with shorter transmission delays than the group of worker nodes.

16. The system of claim 13, wherein monitoring the status comprises:

monitoring a duration of disconnection between the edge node and the computing system; and in response to the duration exceeding a second threshold, determining that the status is one of the set of predetermined statuses.

17. The system of claim 16, wherein identifying the at least one server node and the group of worker nodes further comprises:
   determining computing resources of the plurality of edge nodes; and
   identifying the at least one server node based on the transmission delays and computing resources.

18. The system of claim 17, wherein:
   determining the computing resources of the plurality of edge nodes includes:
      causing a first edge node of the plurality of edge nodes to train a sample model based on sample training data, wherein the sample model and sample training data is received previously from the computing system;
      determining a training time required for training the sample model to achieve a predetermined performance; and
      determining the training time as a metric of the computing resource of the first edge node; and
   identifying the at least one server node based on the transmission delays and computing resources comprises:
      determining a combined metric based on the transmission delay and the training time of each of the plurality of edge nodes; and
      identifying the at least one server node and the group of worker nodes from the plurality of edge nodes, the at least one server node with smaller combined metrics than the group of worker nodes.

19. A computer program product for distributed machine learning in an edge computing environment, being tangibly stored on a non-transient machine-readable medium and comprising machine-executable instructions, the instructions, when executed on a device, causing the device to perform actions comprising:
   monitoring a status of a connection between a computing system and a plurality of edge nodes, the plurality of edge nodes configured to receive a prediction model from the computing system via the connection, the prediction model being trained by the computing system on training data received from the plurality of edge nodes;
   determining the status of the connection between the computing system and the plurality of edge nodes has changed from a normal status to an abnormal status, with the abnormal status being a weak connection mode or an offline mode;
   in response to determining the status is an abnormal status, identifying, according to a parameter server machine learning framework, at least one server node and a group of worker nodes from the plurality of edge nodes, the group of worker nodes configured to train a current prediction model using training data distributed from plurality of edge nodes, the at least one server node configured to aggregate training results received from the group of worker nodes;
   determining a routing path for distributing the training data from the at least one server node to the group of worker nodes based on the abnormal status of the connection;
   distributing the training data from the at least one server node to the group of worker nodes via the routing path;
   training, by the group of worker nodes, a current prediction model received from the computing system using the training data received via the routing path to create a trained prediction model; and
   responsive to determining the status of the connection has returned to the normal status, causing the trained prediction model to be trained by the computing system on training data received from the plurality of edge nodes via the connection.

20. The method of claim 1 wherein distributing the training data includes:
   splitting the training data into a plurality of portions, with a first portion of the plurality of portions of the training data being distributed to a corresponding worker node via the routing path.

* * * * *